(12) United States Patent
Lee et al.

(10) Patent No.: US 8,526,007 B2
(45) Date of Patent: Sep. 3, 2013

(54) APPARATUS AND METHOD FOR MEASURING DISPLACEMENT

(75) Inventors: Ju-Yi Lee, Taipei (TW); Kun-Yi Lin, Taoyuan County (TW); Szu-Han Huang, Chiayi County (TW)

(73) Assignee: National Central University, Taoyuan County (TW)

( * ) Notice: Subject to any disclaimer, the term of this patent is extended or adjusted under 35 U.S.C. 154(b) by 213 days.

(21) Appl. No.: 12/772,370

(22) Filed: May 3, 2010

(65) Prior Publication Data

US 2011/0096336 A1     Apr. 28, 2011

(30) Foreign Application Priority Data

Oct. 28, 2009 (TW) ............................... 98136432 A

(51) Int. Cl.
*G01B 11/02* (2006.01)

(52) U.S. Cl.
USPC .......................................................... 356/498

(58) Field of Classification Search
USPC .......................................... 356/486, 493, 498
See application file for complete search history.

(56) References Cited

U.S. PATENT DOCUMENTS

| 3,938,889 A | * | 2/1976 | McKinnis | ..................... 356/458 |
| 4,633,715 A | * | 1/1987 | Monchalin | ..................... 73/657 |

OTHER PUBLICATIONS

Measuring microvibrations by heterodyne speckle interferometry, Optics Letters, Apr. 1981, vol. 6, No. 4, J-f Willemin.*
Ju-Yi Lee; Kun-Yi Lin; Szu-Han Huang; Wavelength-Modulated Heterodyne Speckle Interferometry for Displacement Measurement;Proc. SPIE, vol. 7389, 73892G (2009), Jun. 15, 2009.

* cited by examiner

*Primary Examiner* — Tarifur Chowdhury
*Assistant Examiner* — Jonathon Cook
(74) *Attorney, Agent, or Firm* — Rosenberg, Klein & Lee

(57) ABSTRACT

The apparatus and method for measuring displacement according to the present invention includes a first beam and a second beam. A first reflection structure reflects a first beam to the surface of an object under test; and a second reflection structure reflects a second beam to the surface of the object under test. The reflected first beam and the reflected second beam have an optical path difference. The object under test scatters a scattering beam of gathering the first and second beams. The scattering beam has an interference signal. A photodetector receives the interference signal of the scattering beam. Then an operational unit receives and computes the interference signal for producing a displacement value. By using the first and second reflection structures, the first and second beams split from an incident beam produce an optical path difference. Thereby, the structure of the apparatus for measuring displacement can be simplified. Besides, the displacement or the amplitude of vibration of the object under test can be measured effectively.

11 Claims, 6 Drawing Sheets

APPARATUS AND METHOD FOR MEASURING DISPLACEMENT

FIELD OF THE INVENTION

The present invention relates to an apparatus and a method for measuring, and particularly to an apparatus and a method for measuring displacement.

BACKGROUND OF THE INVENTION

Currently, at least more than 30 countries worldwide involve in national nanotechnology projects. Nanotechnology integrates various technologies including mechanics, electronics, optics, material science, chemical engineering, fabrication, metrology, biomedical engineering, and microelectromechanical systems (MEMS). With the progress of nanotechnology applied to industrial technologies, the requirements of high precision and resolution in product manufacturing as well as in alignment of machine parts are continuously increasing. In particular, precise planar positioning and in-plan moving measurement technology are crucial in semiconductor, optoelectronic, mechanical processing, and biotechnological industries.

For researching the physical or chemical properties of nanometer-scale structures, a powerful tool is needed for observing the nanostructures. A commonly used tool is the scanning probe microscope. Such kind of instruments needs scanning and positioning platforms with high precision, high resolution, and long scanning range. The measurement and monitoring of displacement is widely applied to such platforms. Nanometer positioning includes driving, sensing, and feedback technologies; and precise measurement of displacement is an indispensable part in sensing technology. Thereby, the measurement technology for displacement can be regarded as the key technology for developing nanotechnologies.

FIG. 1 shows a schematic diagram of an apparatus for measuring displacement according to the prior art. As shown in the figure, the apparatus for measuring displacement is published by R. Dandliker and J.-F. Willemin in 1981. (Refer to "Measuring microvibrations by heterodyne speckle interferometry", Optics Letters, Volume 6, Issue 4, Apr. 1, 1981, Pages 165-167) The apparatus for measuring displacement according to the prior art comprises a laser 11, a spectroscope 13, a plurality of acousto-optic modulators 14, a plurality of reflectors 15, a plurality of lenses 16, a grating under test 17, and a photodetector 18. The laser 11 emits a beam 12A, which is split into a beam 12B and a beam 12C by the spectroscope 13. The beams 12B, 12C are incident to the acousto-optic modulators 14, and then incident to the reflectors 15, which determine the path of the beams. Afterwards, the lenses 16 focus the beams onto the grating under test 17. The grating under test 17 diffracts and splits the beams 12B, 12C. Overlap and interfere the beams 12D, 12E diffracted by the beams 12B, 12C, and then propagate the beams 12C, 12D to the photodetector 18, which receives the interference signal of the two diffracted beams. Thereby, when the grating 17 shifts, the displacement thereof can be calculated. However, because the apparatus for measuring displacement according to the prior art uses the acousto-optic modulator as the generator of the heterodyne light source, the huge size of the acousto-optic modulator inhibits the system from miniaturization.

Accordingly, the present invention provides an apparatus for measuring displacement, which is small, facilitating miniaturization of the apparatus for measuring displacement. In addition, the amplitude of vibration can also be increased according to the present invention. Thereby, the problems described above can be solved.

SUMMARY

An objective of the present invention is to provide an apparatus and a method for measuring displacement, which use a first refection structure and a second reflection structure to produce optical path difference between a first beam and a second beam split from the incident beam. Thereby, the structure of the apparatus for measuring displacement can be simplified. By measuring an interference signal of a scattering beam of gathering the first and second beams, the displacement or the amplitude of vibration of the object under test can be increased.

The apparatus for measuring displacement according to the present invention comprises a light source, a spectroscope, a first refection structure, a second reflection structure, a photodetector, and an operational unit. The spectroscope splits an incident beam from said light source into a first beam and a second beam. The first reflection structure reflects the first beam to the surface of an object under test; and the second reflection structure reflects the second beam to the surface of the object under test. The reflected first beam and the reflected second beam have an optical path difference. The object under test scatters a scattering beam of gathering the first and second beams. The scattering beam has an interference signal. A photodetector receives the interference signal of the scattering beam. Then the operational unit receives and processes the interference signal to derive the displacement of the object.

The method for measuring displacement according to the present invention comprises: firstly providing a light source with an incident beam; then splitting the incident beam into a first beam and a second beam; next, reflecting the first beam to the surface of an object under test; afterwards, reflecting the second beam to the surface of the object under test, and the object under test scatters scattering beam with interference signal by gathering the first beam and the second beam; then, receiving the interference signal; and finally, receiving and processing the interference signal to derive a displacement value.

According to the present invention, by using the first and second reflection structures, an optical path difference between the first and second beam split from the incident beam are produced. Thereby, the structure of the apparatus for measuring displacement can be simplified. Besides, the displacement or the amplitude of vibration of the object under test can be measured effectively.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
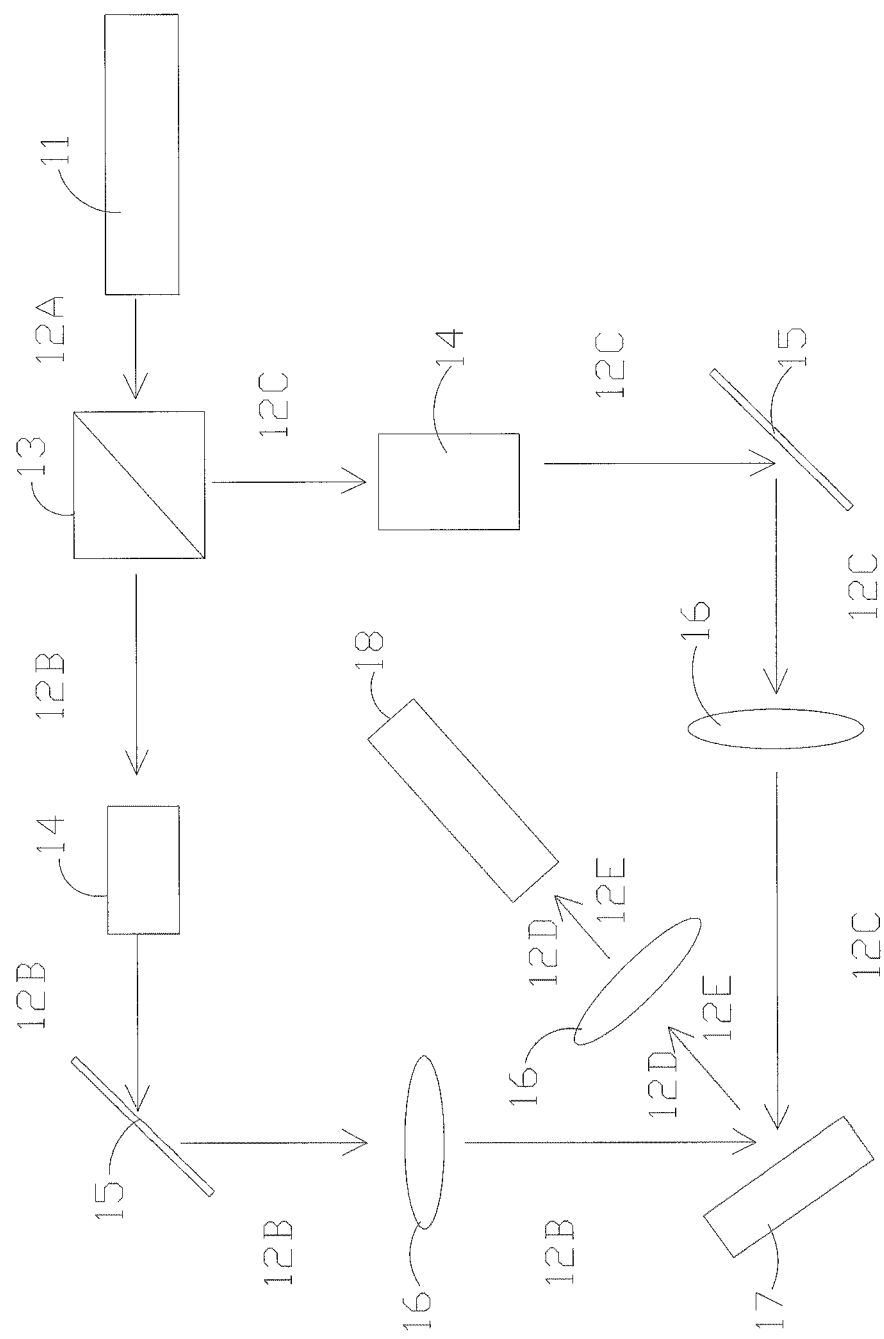
FIG. 1 shows a schematic diagram of an apparatus for measuring displacement according to the prior art.
Figure 2:
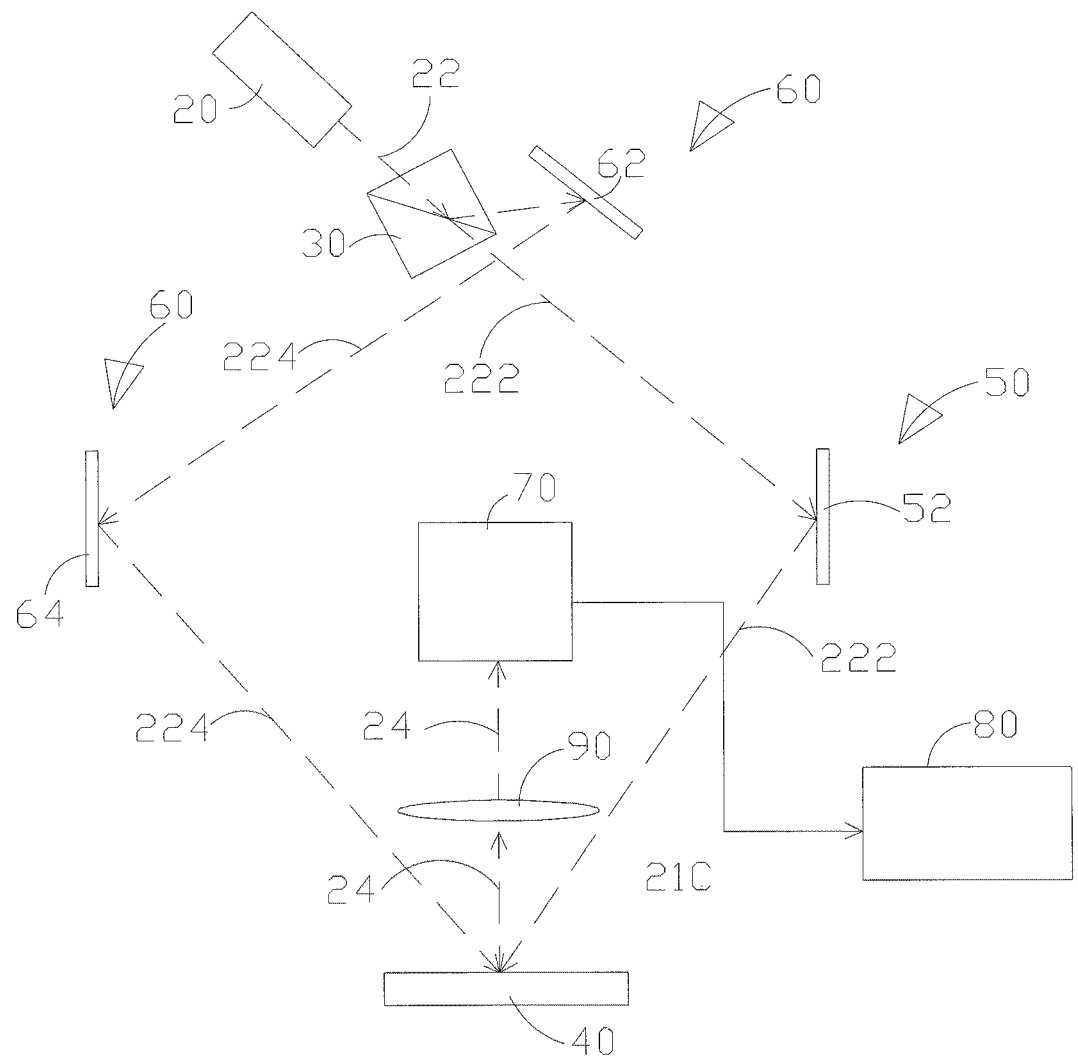
FIG. 2 shows a structural schematic diagram of an apparatus for measuring displacement according to a preferred embodiment of the present invention.

FIG. 2 shows a structural schematic diagram of an apparatus for measuring displacement according to a preferred embodiment of the present invention. As shown in the figure, the apparatus for measuring displacement according to the present invention comprises a light source 20, a spectroscope 30, a first reflection structure 50, a second reflection structure 60, a photodetector 70, and an operational unit 80. The spectroscope 30 receives an incident beam 22 emitted from the light source 20, and splits the incident beam 22 into a first beam 222 and a second beam 224. The first reflection structure 50 reflects the first beam 222 to the surface of an object under test 40; and the second reflection structure 60 reflects the second beam 224 to the surface of the object under test 40. The reflected first beam 222 and the reflected second beam 224 have an optical path difference. The object under test 40 scatters a scattering beam 24 of gathering the first and second beams 222, 224. The scattering beam 24 has an interference signal. The photodetector 70 receives the interference signal of the scattering beam 24. Then the operational unit 80 receives and processes the interference signal to derive the displacement of the object. An optical path difference between the first and second beams 222, 224, which are split from the incident beam 22, is produced by using the first reflection structure 50 and second reflection structure 60. Thereby, the apparatus for measuring displacement can be miniaturized. Besides, the displacement or the amplitude of vibration of the object under test 40 can be measured effectively.

The wavelength of the light source 20 according to the present invention can vary with time. Thereby, a function generator can be used to generate a sawtooth wave signal for modulating the wavelength of the light source 20. The incident beam 22 emitted from the light source 20 is split into the first beam 222 and the second beam 224 by the spectroscope 30. Then, the first reflection structure 50 and the second reflection structure 60 are used to produce optical paths difference between the first and second beams 222, 224.

The first reflection structure 50 includes a first reflector 52, which reflects the first beam 222 to the surface of the object under test 40. The second reflection structure 60 includes a second reflector 62 and a third reflector 64. The second reflector 62 reflects the second beam 224; the third reflector 64 receives the second beam 224 reflected by the second reflector 62, and reflects it to the object under test 40. In comparison with the first reflection structure 50 according to the present preferred embodiment, the second reflection structure 60 has an extra reflector, and hence making the travel distance of the second beam 224 different from that of the first beam 222. Thereby, by means of the first and second reflection structure 50, 60, the different optical paths of first and second beams 222, 224 are produced.

Accordingly, when the object under test 40 scatters the scattering beam 24 of gathering the first and second beams 222, 224, the two beams 222, 224 incident to the object under test 40 have an optical path difference. Thereby, the scattering beam 24 has heterodyne signals therein.

The present invention further comprises a lens 90, which focuses the scattering beam 24 on the photodetector 70. The lens 90 gathers the heterodyne scattering beam 24 scattered by the scattering surface. Then the photodetector 70 gathers the interference signal of the scattering beam 24. Finally, the operational unit 80 extracts the continuous signals; identifies the sine and cosine components of the signals; and performs computations to give the phase, which is then converted to displacement information.

Figure 3:
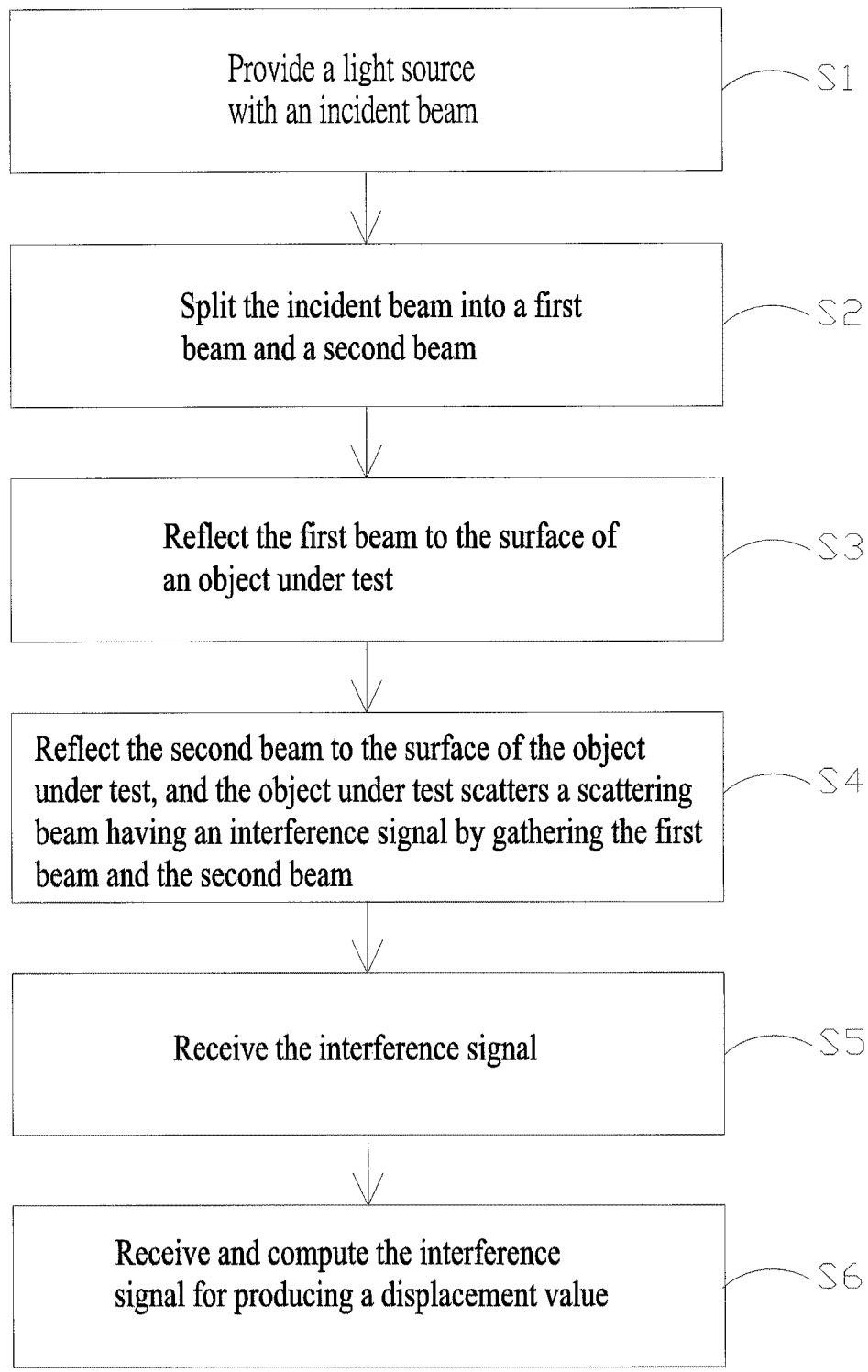
FIG. 3 shows a flowchart of a method for measuring displacement according to a preferred embodiment of the present invention.

FIG. 3 shows a flowchart of the operational unit receiving the interference signal and computing the displacement according to a preferred embodiment of the present invention. As shown in the figure, first, the step S1 is executed for providing the wavelength modulated light source 20 with the incident beam 22. Then, the step S2 is executed for splitting the incident beam 22 into the first beam 222 and the second beam 224 using the spectroscope 30. Next, the step S3 is executed for reflecting the first beam 22 to the surface of the object under test 40 using the first reflection structure 50. Afterwards, the step S4 is executed for reflecting the second beam 224 to the surface of the object under test 40 using the second reflection structure 60, and the object under test 40 scattering the scattering beam 24 having the interference signal by gathering the first beam 222 and the second beam 224. Then, the step S5 is executed for receiving the interference signal using the photodetector 70. Finally, the step S6 is executed for receiving and processing the interference signal to derive the displacement of the object by using the operational unit 80.

Figure 4:
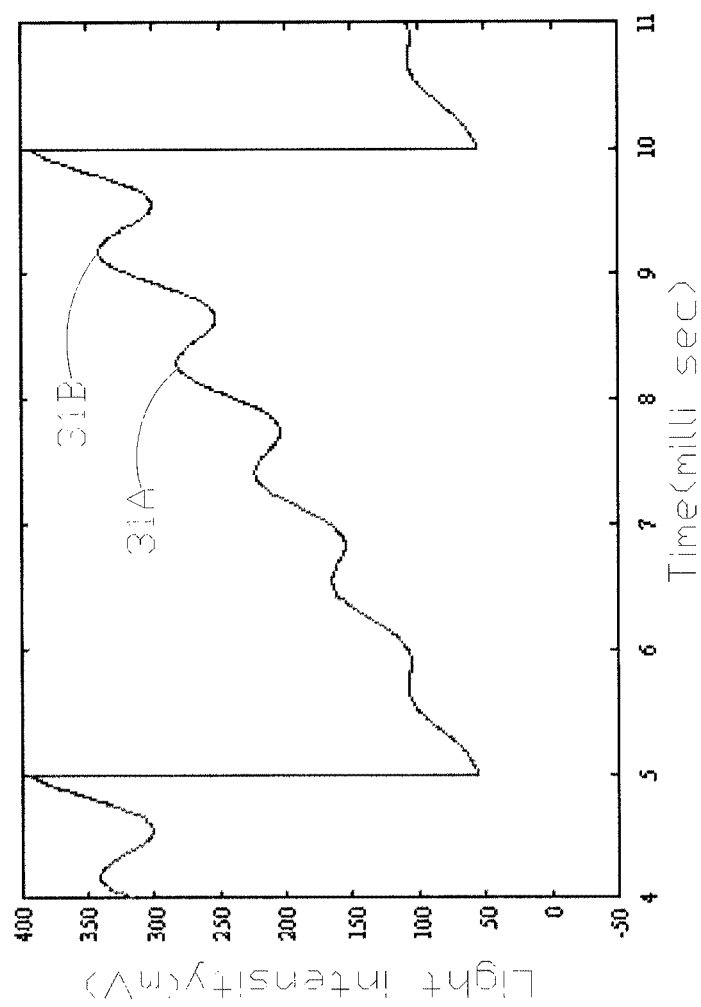
FIG. 4 shows the detected light intensity as a function of time according to a preferred embodiment of the present invention.
Figure 5:
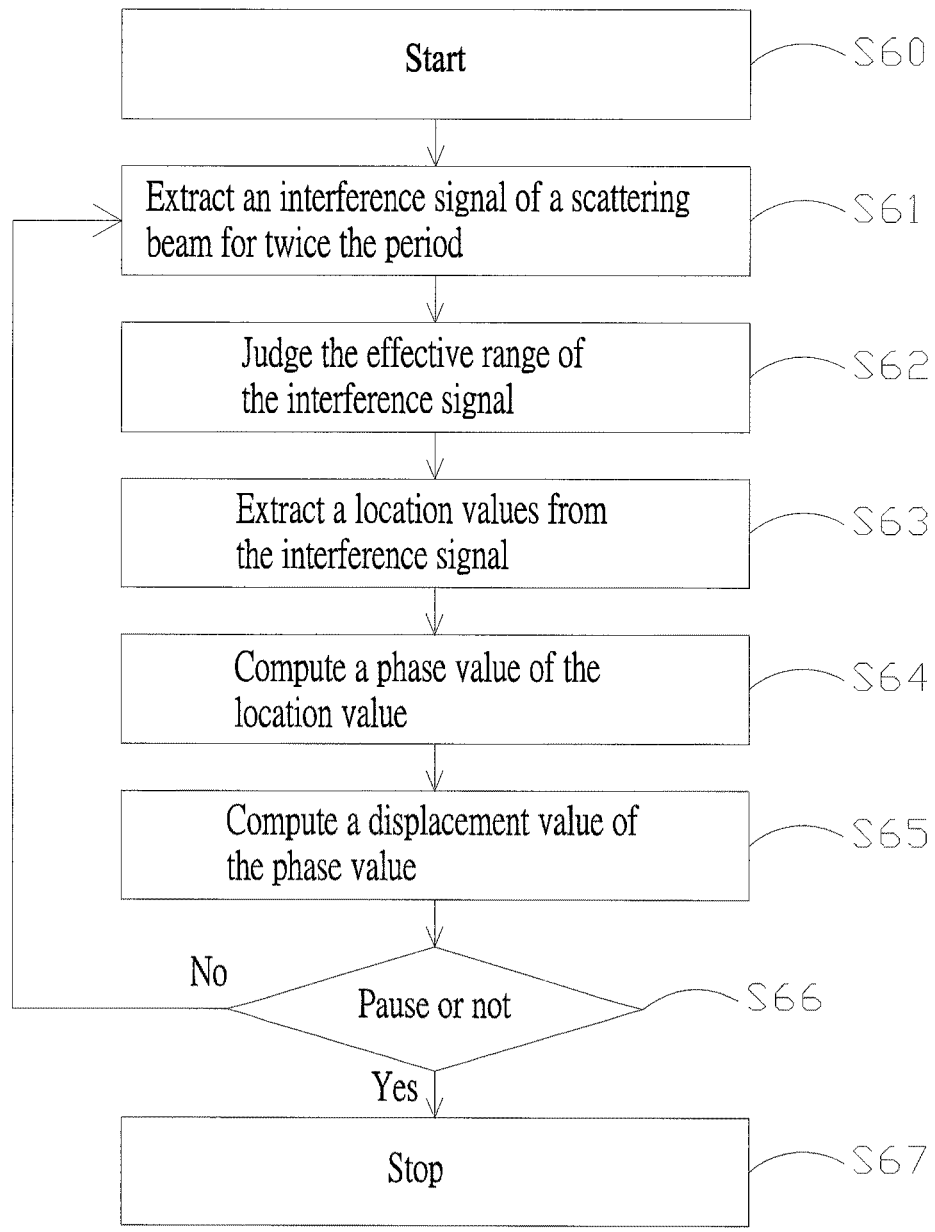
FIG. 5 shows a flowchart of the operating unit receiving the interference signal and computing the displacement of the interference signal according to a preferred embodiment of the present invention.

FIG. 4 and FIG. 5 show the detected light intensity as a function of time and a flowchart of the operating unit receiving the interference signal and computing the displacement of the interference signal according to a preferred embodiment of the present invention. According to the present invention, when the operational unit 80 computes the displacement of the object under test 40, firstly, the step S60 is executed for starting. Then, the step S61 is executed for extracting an interference signal of a scattering beam for twice the period. The purpose of extracting the interference signal for twice or greater than twice the period is to ensure a complete signal in the extracted interference signal for subsequent analysis. Next, the step S62 is executed for judging the effective range of the interference signal. According to the Principle of image formation, a scattering surface can be regarded as composed by various sine gratings with different spatial frequencies. Each of the various sine gratings with different spatial frequencies corresponds to a set of ±1st-order diffracted beams. Thereby, the first beam 222 scattered from the scattering surface of the object under test 40 can be regarded as ±1st-order diffracted beams by gratings with various intervals. Hence, the scattering beam 24 received by the photodetector 70 can be regarded as the +1st-order diffracted beam by a sine-wave grating with intervals of $$p = \frac{\lambda}{2\sin\theta}.$$

For the second beam 224 with the same incident angle in the other direction, after scattered by the scattering surface, the scattering beam 24 received on the detection surface can be regarded as the −1st-order diffracted beam by a sine-wave grating with the same intervals.

If the gratings have in-plane displacement by x, the +1st-order and the −1st-order diffracted beams will have phase variations with the same amplitude but in opposite directions, as shown in Equations (1) and (2):

$$\phi_{+1} = \frac{2\pi}{p}x = \frac{2\pi}{\lambda_0}x\sin\theta, \text{ and} \quad (1)$$

$$\phi_{-1} = -\frac{2\pi}{\lambda_0}x\sin\theta, \quad (2)$$

Thereby, the optical interference signal received on the detection surface can be expressed as:

$$I \propto |E_{+1} + E_{-1}|^2 = |E_0 e^{i[k(l_a+l_D)+\phi_{+1}]} + E_0 e^{i[k(l_b+l_D)+\phi_{-1}]}|^2 \quad (3)$$

$$= 2E_0^2\left\{1 + \cos\left[k(l_a - l_b) + \frac{4\pi}{\lambda}x\sin\theta\right]\right\},$$

Where wave constant $k=2\pi/\lambda$, $l_a$ is optical path length of beam 222 in FIG. 2, $l_b$ is optical path length of beam 224 in FIG. 2 and $l_D$ is optical path length of beam 24 in FIG. 2. As shown in Equation (3), the interference term in the light intensity still contains the displacement information of the gratings (the scattering surface of the object under test 40). Thereby, it is proven that the in-plane displacement of the scattering surface can appear in the phase of the light intensity of the interference beam by overlapping two incident beams at the same incident angle but in different directions. The step S63 is executed for extracting values from the interference signal. The step S64 is executed for computing a phase value by the extracted values in S63. According the derivation above, the phase variation of the interference signal can be extracted:

$$\Delta\Phi = \frac{4\pi}{\lambda}x\sin\theta, \quad (4)$$

Rearranging terms gives:

$$x = \frac{\lambda}{4\pi\sin\theta}\Delta\Phi, \quad (5)$$

Accordingly, the step S65 is executed for computing a displacement value from the phase deviation. Finally, the step S66 is executed for judging if to pause the system. If yes, the step S67 is executed for stopping; if not, return to the step S1. The acquired continuous data is segmented according to the modulation frequencies of the light source 20. In each segment of data, find arbitrary two adjacent relative peaks and define their phase difference as 2π. Because sine and cosine functions differ by π/2 in phase, when two adjacent relative peaks are found to be located at P1 represented by 31A and P2 represented by 31B in FIG. 4, define Q1 as the signal of P1 and as a sine function. Besides, define Q2 as the signal located at P1+(P2−P1)/4 and as a cosine function. By using $$\Phi = \tan^{-1}\frac{\sin\Phi}{\cos\Phi} = \tan^{-1}\frac{Q1}{Q2},$$

the phase ϕ is calculated. Then Equation (5) is used for deducing the displacement value.

Figure 6:
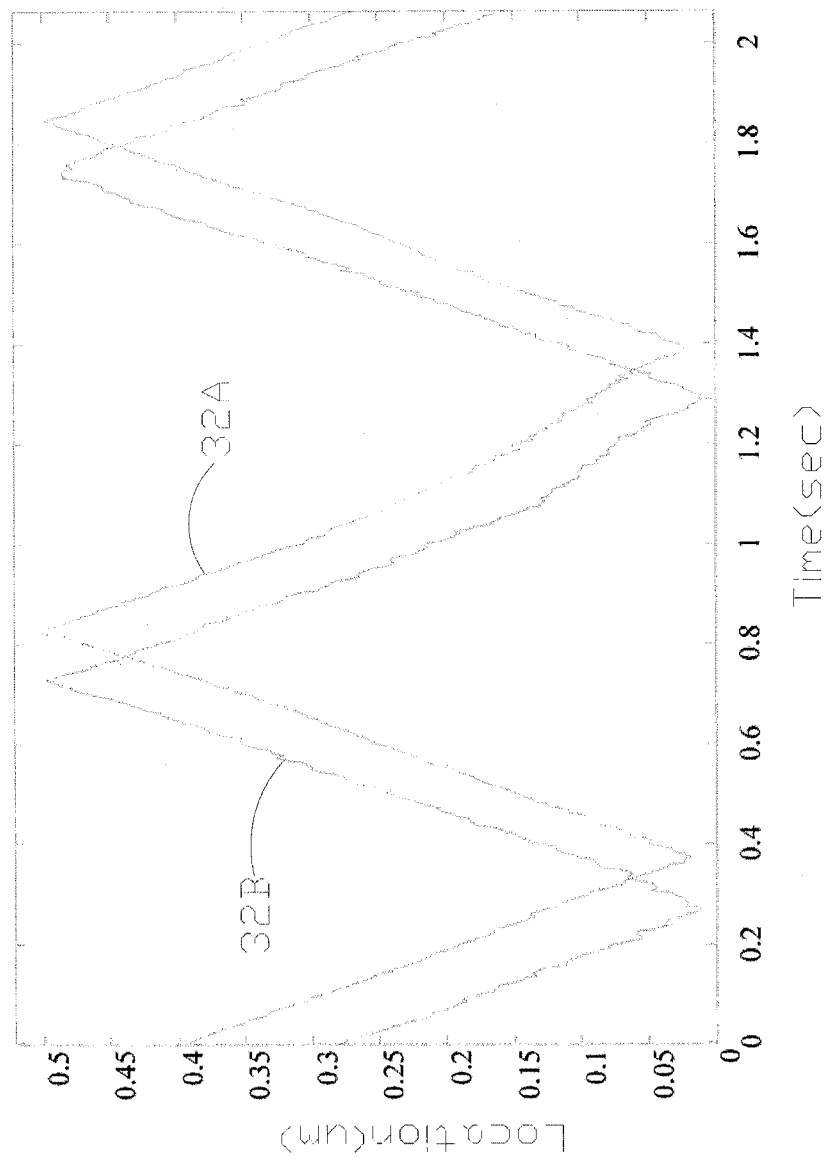
FIG. 6 shows measured curves of displacement according to the apparatus for measuring displacement of the present invention and to a commercial capacitive displacement meter.

FIG. 6 shows measured curves of displacement according to the apparatus for measuring displacement of the present invention and to a commercial capacitive displacement meter. As shown in the figure, the curve 32A is the measured curve of displacement according to the apparatus for measuring displacement of the present invention, while 32B is the measured curve of displacement according to a commercial capacitive displacement meter. From the figure, the two measured results are close. However, the cost of the apparatus for measuring displacement according to the present invention is much lower than that of a commercial capacitive displacement meter.

To sum up, the apparatus for measuring displacement according to the present invention comprises a wavelength modulated light source, a spectroscope, a first refection structure, a second reflection structure, a photodetector, and an operational unit. The spectroscope splits an incident beam from said light source into a first beam and a second beam. The first reflection structure reflects the first beam to the surface of an object under test; and the second reflection structure reflects the second beam to the surface of the object under test. The reflected first beam and the reflected second beam have an optical path difference. The object under test scatters a scattering beam of gathering the first and second beams. The scattering beam has an interference signal. The photodetector receives the interference signal of the scattering beam. Then the operational unit receives and computes the interference signal for producing a displacement value. By using the first and second reflection structures, the first and second beams split from the incident beam produce an optical path difference. Thereby, the structure of the apparatus for measuring displacement can be simplified. Besides, the displacement or the amplitude of vibration of the object under test can be measured effectively.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. An apparatus for measuring displacement, comprising:
   a function generator;
   a light source coupled to said function generator, said light source outputting modulated output beam responsive to a wavelength modulating of said function generator;
   a beam splitter, splitting a modulated output beam from said light source into a first beam and a second beam, the first beam and the second beam having the same frequency;
   a first refection structure, reflecting said first beam to the surface of an object under test;
   a second reflection structure, reflecting said second beam to the surface of said object under test, said second reflection structure further having an extra reflector in comparison with said first reflection structure for providing said reflected first beam and said reflected second beam having an optical path length difference, said object under test scattering a scattering beam of gathering said first and second beams, and said scattering beam having an interference signal;
   a photodetector, receiving said interference signal of said scattering beam; and
   an operational unit, receiving and computing said interference signal for producing a displacement value.

2. The apparatus for measuring displacement of claim 1, wherein said second reflection structure includes:
   a second reflector, reflecting said second beam; and
   a third reflector, receiving said second beam reflected by said second reflector, and reflecting said second beam to the surface of said object under test.

3. The apparatus for measuring displacement of claim 1, and further comprising a lens, focusing said scattering beam to said photodetector.

4. The apparatus for measuring displacement of claim 1, wherein the wavelength of said light source varies with time.

5. The apparatus for measuring displacement of claim 1, wherein said operational unit extracts location values from said interference; computes a phase value by said values; and gives said displacement value according to said phase value.

6. A method for measuring displacement, comprising steps of:
   providing a function generator;
   providing a light source coupled to said function generator and outputting a wavelength of a modulated output beam responsive to a wavelength modulating of said function generator;
   splitting said modulated output beam into a first beam and a second beam, the first beam and the second beam having the same frequency;
   reflecting said first beam to the surface of an object under test;
   selectively reflecting said second beam to the surface of said object under test, a second reflection structure further having an extra reflector in comparison with a first reflection structure for providing said reflected first beam and said reflected second beam having an optical path length difference, and said object under test scattering a scattering beam having an interference signal by gathering said reflected first beam and said reflected second beam;
   receiving said interference signal; and
   receiving and computing said interference signal for producing a displacement value.

7. The method for measuring displacement of claim 6, wherein said step of receiving and computing said interference signal for producing said displacement value further comprises steps of:
   extracting location values from said interference signal;
   computing a phase value from said location values; and
   giving said displacement value according to said phase value.

8. The method for measuring displacement of claim 7, and further comprising a step of extracting said interference signal of said scattering beam for twice a period thereof before said step of extracting said location values of said interference signal.

9. The method for measuring displacement of claim 8, and further comprising a step of judging the effective range of displacement of said interference signal after said step of extracting said interference signal of said scattering beam for twice the period.

10. The method for measuring displacement of claim 7, and further comprising a step of judging if to pause extracting said scattering beam after said step of giving said displacement value according to said phase value.

11. The method for measuring displacement of claim 10, wherein said step of judging if to pause extracting said scattering beam, if yes, stop; if not, extract said interference signal of said scattering beam for twice the period.

* * * * *